United States Patent [19]
Gateaud

[11] Patent Number: 5,544,573
[45] Date of Patent: Aug. 13, 1996

[54] DEVICE FOR LOCKING A BOWL ON A MOTOR SUPPORT OF A FOOD PROCESSOR

[75] Inventor: Andre Gateaud, Perrecy-Les-Forges, France

[73] Assignee: Robot-Coupe (S.N.C.), France

[21] Appl. No.: 554,487

[22] Filed: Nov. 7, 1995

[30] Foreign Application Priority Data

Nov. 9, 1994 [FR] France .................................. 94 13475

[51] Int. Cl.⁶ .......................... A23N 1/00; A47J 43/046; A47J 43/07; B02C 18/16
[52] U.S. Cl. ........................ 99/492; 99/510; 200/302.2; 241/37.5; 241/92
[58] Field of Search ................... 99/337, 492, 501–505, 99/509–513; 241/37.5, 92, 282.1, 282.2, 280, 36; 200/302.2; 83/355, 356.3; 16/257; 361/203

[56] References Cited

U.S. PATENT DOCUMENTS

| | | | |
|---|---|---|---|
| 3,892,365 | 7/1975 | Verdun | 241/92 |
| 4,216,917 | 8/1980 | Clare et al. | 241/37.5 |
| 4,240,338 | 12/1980 | McClean | 99/501 |
| 4,448,100 | 5/1984 | Breeden | 83/355 |
| 4,506,836 | 3/1985 | Williams | 241/92 |
| 4,523,720 | 6/1985 | Behringer et al. | 241/282.1 |
| 4,614,306 | 9/1986 | Doggett | 16/257 |
| 4,629,131 | 12/1986 | Podell | 241/36 |
| 4,741,482 | 5/1988 | Coggiola et al. | 241/37.5 |
| 4,799,626 | 1/1989 | Hickel et al. | 99/492 |
| 5,355,784 | 10/1994 | Franklin et al. | 99/492 |
| 5,454,299 | 10/1995 | Gonneaud | 99/492 |
| 5,486,665 | 1/1996 | LeRouzic | 200/302.2 |

Primary Examiner—Timothy F. Simone
Attorney, Agent, or Firm—Eckert Seamans Cherin & Mellott

[57] ABSTRACT

A device for locking a bowl on a motor support. According to the invention, a latch is hinged to the handle of the bowl and serves to penetrate through a slot into a channel that itself includes a locking surface. The invention is applicable to food processor appliances.

4 Claims, 2 Drawing Sheets

DEVICE FOR LOCKING A BOWL ON A MOTOR SUPPORT OF A FOOD PROCESSOR

The present invention relates to a device for use in a food processor to lock a bowl on its motor support or base.

BACKGROUND OF THE INVENTION

Food processors are well known that are constituted by a base containing a motor whose drive shaft projects from the top surface thereof, and by a bowl capable of being engaged on said motor support to receive in succession a plurality of tools which are rotated inside the bowl by said drive shaft. One such appliance is described in FR-A-2 147 361 (Verdun), in particular.

Proposals have already been made to secure the bowl to the support in its center by providing a sheath or ferrule that projects above the base around the drive shaft and that carries regularly spaced apart projections near its top end. Under such conditions, the bowl itself includes a central protective chimney whose inside contains corresponding projections which, when the bowl is in its working position, serve to retain the bowl against vertical forces. In a mounting of that kind, it is known to provide an abutment piece at the periphery of the bowl to prevent the bowl from rotating under drive from the tools and the food being processed within the bowl. Otherwise the bowl might be entrained by friction against the walls of the bowl from the food being processed. In addition, in order to avoid any contact between a hand and the tools while they are rotating, the bowl must necessarily be closed by a lid while the tools are being rotated. To this end, a lid is removably fixed to the top of the bowl. Such closure is generally obtained by a bayonet type fastening. However, the direction in which the lid is fastened on the bowl is the same as the direction in which the bowl is fastened on the base. In other words, once both of the above operations have been performed, if it is desired to remove the lid before removing the bowl from the base, then it is necessary to prevent the bowl from rotating by using anti-return means that oppose rotation of the bowl in the clockwise direction, and more generally in the direction opposite to the tool-rotation direction.

OBJECTS AND SUMMARY OF THE INVENTION

The invention seeks to mitigate the above drawback and to provide an appliance that enables the bowl to be temporarily locked on its base in the direction opposite to the direction of rotation of the tools and the direction of rotation of the bowl while it is being put into place.

The present invention provides a device for locking a bowl on a motor support of a food processor appliance, the bowl being provided with a handle extending parallel to the axis of said bowl, the bowl being fixed on the support via its center, and including at its periphery a rotary abutment part, which device comprises both a part that is secured to the base, said part having an abutment surface against rotation and a locking face opposite to said abutment surface, and a latch hinged on the handle, which latch includes a locking face for co-operating with the locking face of the base while in a first position, and coming over said locking face while in a second position.

In the first position, the bowl is locked in both directions relative to the support, whereas in the second position it is capable of rotating in the direction opposite to the direction of rotation of the tools.

According to another characteristic of the invention, the center of gravity of the latch is eccentric relative to the hinge axis thereof so that the latch penetrates into the abutment part of the base under its own weight.

According to yet another characteristic of the invention, the latch includes a control tab.

The abutment against rotation and the anti-return locking abutment are preferably spaced apart, radially.

BRIEF DESCRIPTION OF THE DRAWINGS

Other characteristics and advantages of the invention appear from the following description of a particular embodiment, given solely by way of non-limiting example and with reference to the drawings, in which.

MORE DETAILED DESCRIPTION

Figure 1:
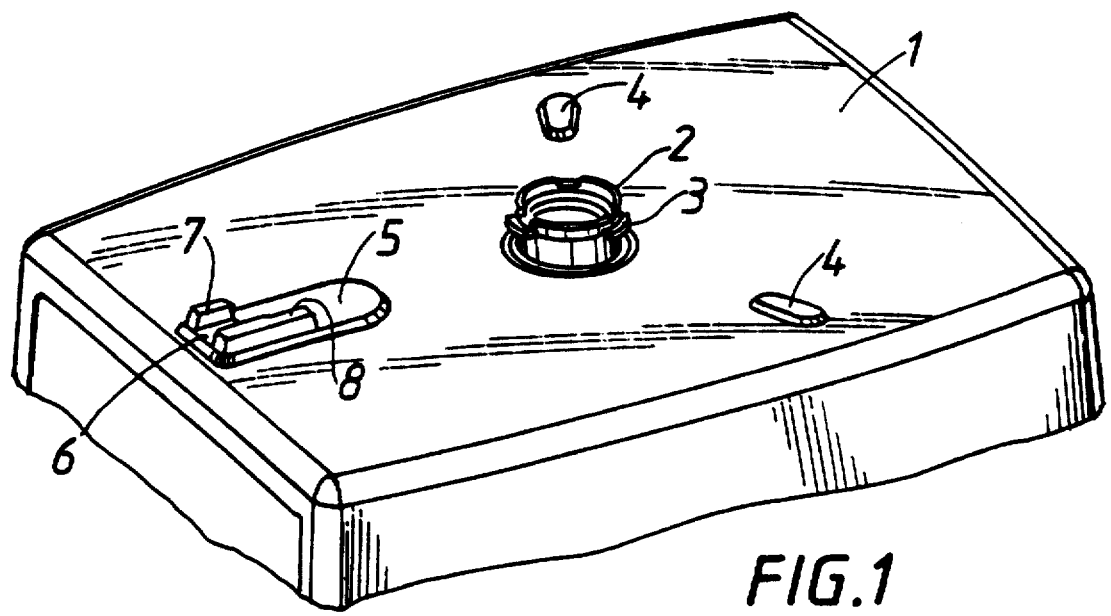
FIG. 1 is a view of the top portion of the base or support that includes the motor for driving the tools.

FIG. 1 shows the top portion of the motor-containing base 1, and there can be seen a sheath or chimney 2 in the center thereof through which there passes the drive shaft (not shown), said sheath having fastening projections 3 for holding the bowl in the vertical position. Thrust surfaces 4 and 5 are also formed on the top surface of the base 1 for the purpose of receiving the bottom of the bowl, and in the example shown there are three of these thrust surfaces that are angularly spaced apart at 120° intervals. The thrust surface 5 comprises two vertical faces respectively referenced 7 and 8 on either side of a channel 6 and respectively constituting the anti-return locking face 7 and the face 8 that constitutes a rotary abutment.

Figure 2:
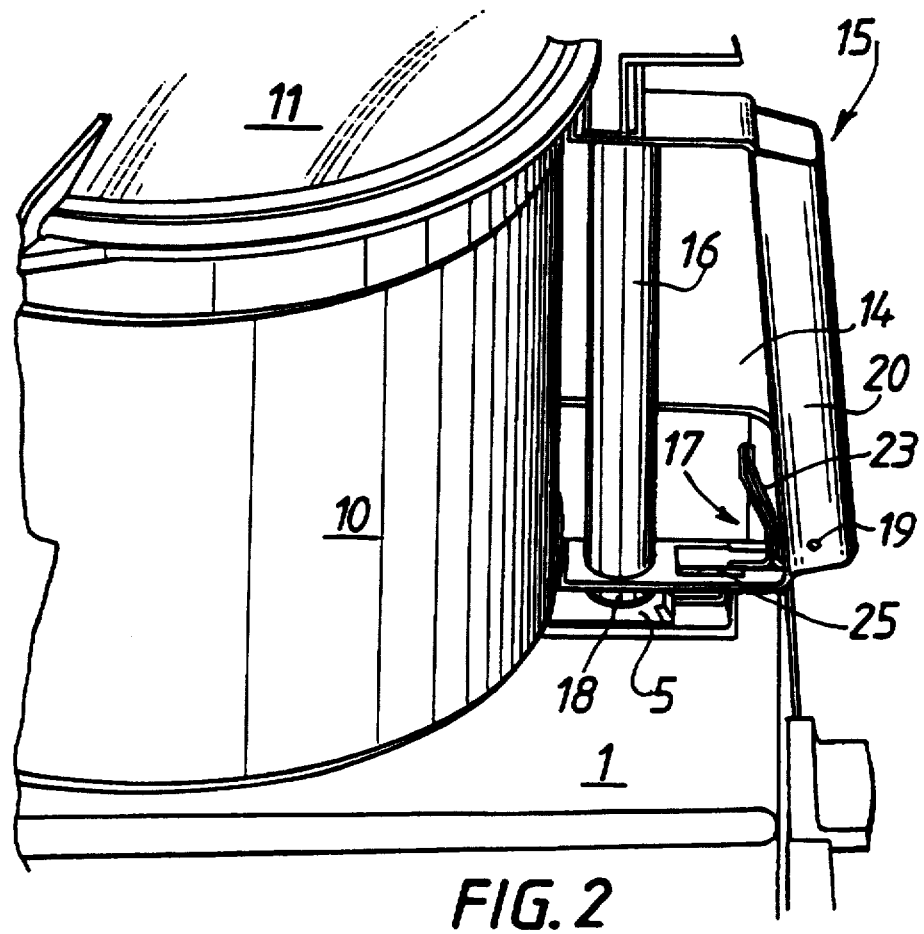
FIG. 2 is a fragmentary view of the base, of the bowl, of its handle, and of the lid in the locked position.

A bowl 10 can be removably mounted on the base 1 in the manner shown in part in FIG. 2. The bowl 10 has a bottom with a chimney extending above the center thereof, and the bottom portion of the chimney is fixed on the sheath 2 by means of studs. The top of the bowl is closed by a lid 11. On the side of the bowl 10 there extends a handle given overall reference 15. In conventional manner, the handle 15 includes a housing 16 for a safety rod (not shown). The bottom end of the housing includes a cylindrical portion 18 projecting downwards and forming a rotary abutment by coming into contact with the surface 8. In the gap 14 defined by the handle 15 there is mounted a latch 17 which is shown in perspective in FIG. 4. The latch 17 is hinged at 19 to the portion 20 of the handle that is intended to be held in the hand.

Figure 3:
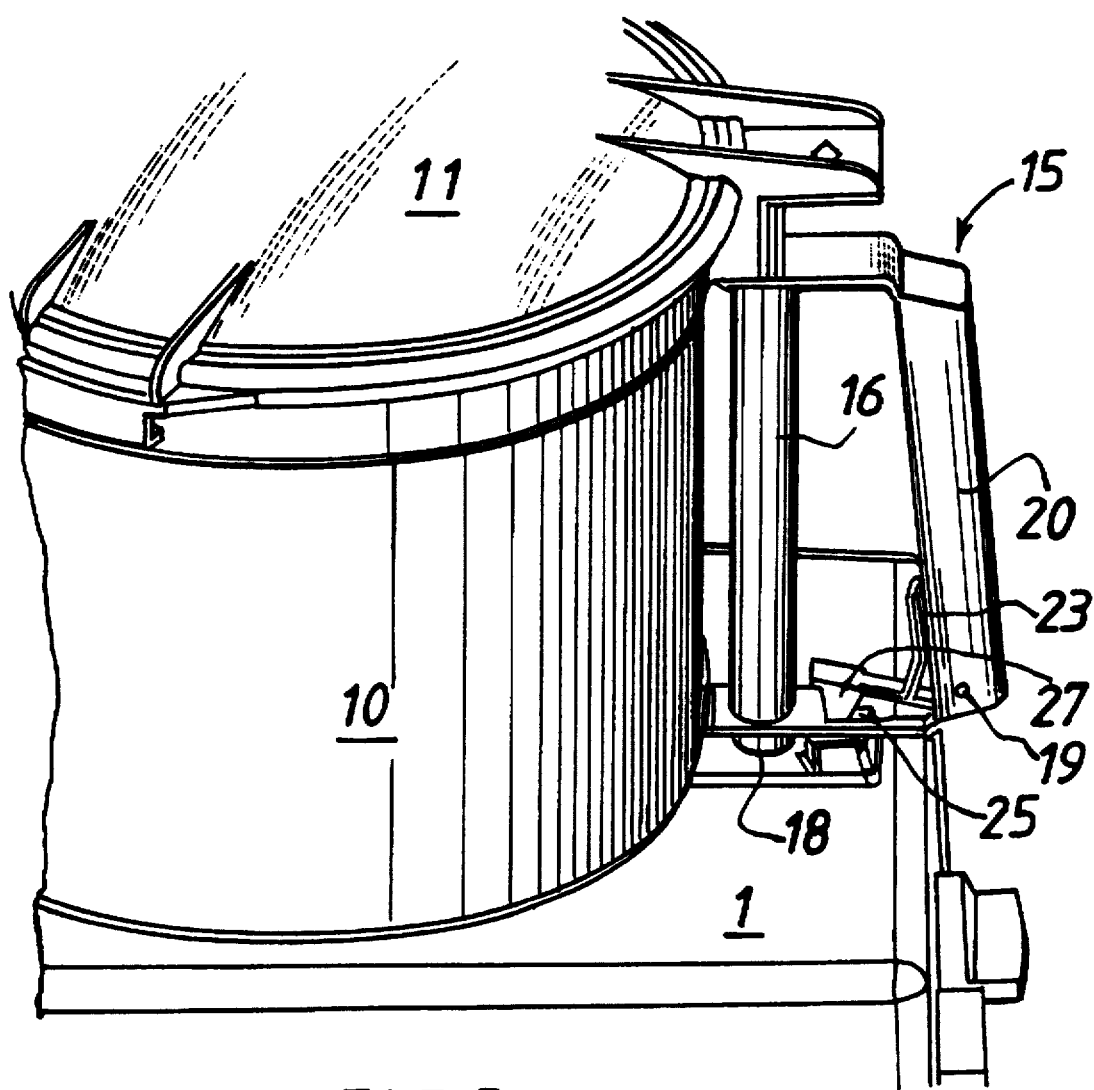
FIG. 3 shows the same set of components as FIG. 2, but in the unlocked position.
Figure 4:
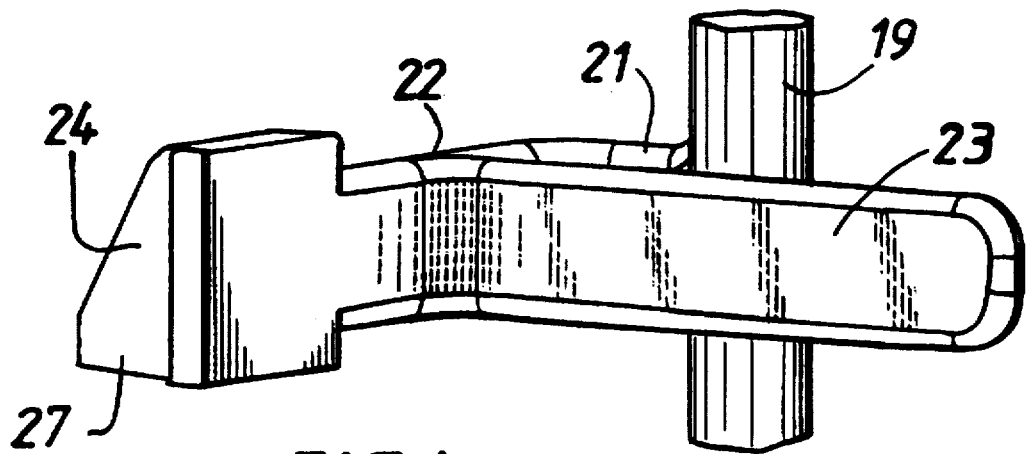
FIG. 4 is a perspective view of the latch.

The latch 17 is shown in greater detail in FIG. 4, and starting from a hinge axis 19, it comprises a first arm 21 from which there projects perpendicularly a second arm 22. The second arm has a control trigger 23 mounted thereon substantially perpendicularly, while a block 24 whose surface 27 constitutes an anti-return locking surface is mounted at the end of the arm 22. The latch automatically prevents the bowl from rotating when the block 24 comes over the slot 25 (FIGS. 2 and 3) so that the face 27 comes into contact with the locking surface 7.

With reference to FIG. 3, it can be seen that the latch is in its unlocking or inoperable position when the trigger 23 is pressed against the inside surface of the handle 20.

Beneath the block 24, there is provided a slot 25 in the spacer connecting the cylinder 16 to the hand-engaging portion 20 of the handle, which slot allows the block 24 to project downwards. According to a characteristic of the invention, the block 24 falls under its own weight into the slot 25 so that when the bowl 10 is in position on the base 1, the face 27 of the block comes into contact with the face 7 of the thrust surface 5, as shown in FIG. 2.

In the example shown, the tools rotate anticlockwise, the bowl 10 is fixed on the chimney in the same (anticlockwise) direction, and the rotary abutment 18 makes contact with the spherical surface 8 of the same radius. The lid is closed on the bowl by a bayonet type system by rotation in the same direction. The latch 17 is in its raised position while the bowl 10 is being mounted on the base 1. Once the bowl has been put into its working position, i.e. once the rod 18 is in abutment against the surface 8 corresponding to releasable locking, then the block 24 of the latch 17 falls downwards through the slot 25 and into the channel 6 under its own weight. At this moment, the face 27 comes into contact with the face 7.

The bowl is thus prevented from rotating anticlockwise by the abutment 8, 18 and from rotating clockwise by contact 7, 27. The tool is then mounted inside the bowl and the working lid is closed by rotation and locking relative to the bowl. Processing can then begin. When the operation is over, it is possible to remove the lid, while the bowl remains stationary.

When it is necessary to transport the assembly comprising the bowl plus the lid, the user squeezes the trigger 23, thereby pivoting the latch 17 in the clockwise direction away from the channel 6. The bowl can then be rotated anticlockwise and thus be disengaged from the base.

Naturally, the directions of rotation could be inverted.

Numerous variants may be made in particular by substituting equivalent technical means, without thereby going beyond the ambit of the invention.

I claim:

1. A device for locking a bowl on a motor support for a food processor appliance, the bowl being fixed on the support via its center and including at its periphery a part for providing a rotary abutment, the device comprising a part secured to the base and having a rotary abutment surface and a locking face opposite to said abutment surface, and comprising, on a handle, a hinged latch including a locking face designed to co-operate with the locking face of the base while the latch is in a first position, and moving above said locking face while the latch is in a second position.

2. A locking device according to claim 1, wherein the center of gravity of the latch is offset from its hinge axis so that the latch penetrates into the abutment latch of the base under its own weight.

3. A locking device according to claim 1, wherein the locking and abutment surfaces are regularly spaced apart from each other by a channel.

4. A locking device according to claim 1, wherein the latch includes a control trigger.

* * * * *